L. R. CULVER.
AEROPLANE.
APPLICATION FILED MAY 5, 1908.

955,389.

Patented Apr. 19, 1910.
7 SHEETS—SHEET 4.

L. R. CULVER.
AEROPLANE.
APPLICATION FILED MAY 5, 1908.
955,389.
Patented Apr. 19, 1910.
7 SHEETS—SHEET 5.
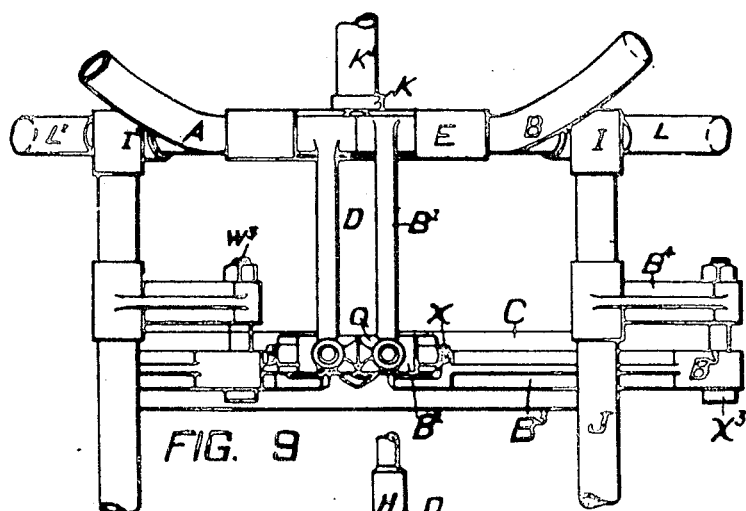
FIG. 9
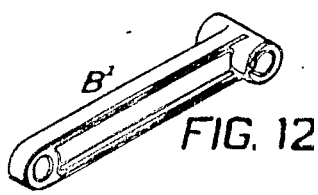
FIG. 12
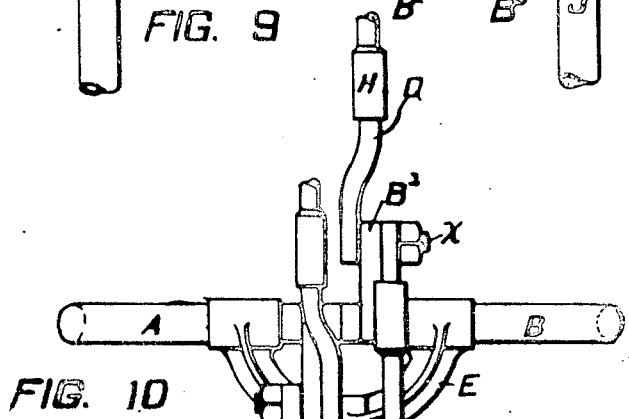
FIG. 10
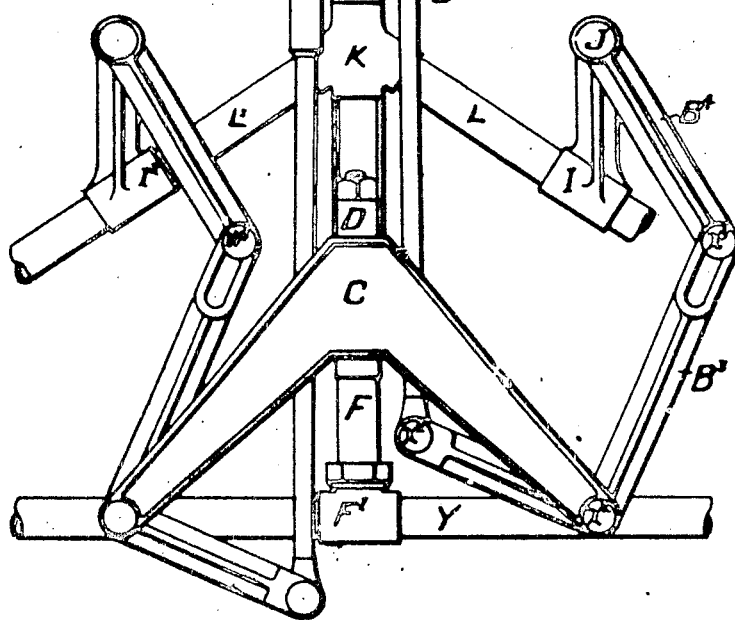
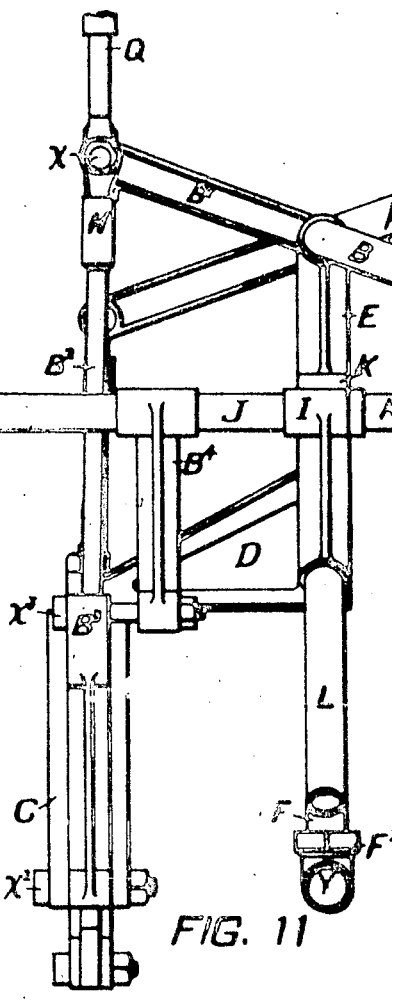
FIG. 11

955,389.
AEROPLANE.
APPLICATION FILED MAY 5, 1908.
Patented Apr. 19, 1910.
7 SHEETS—SHEET 6.
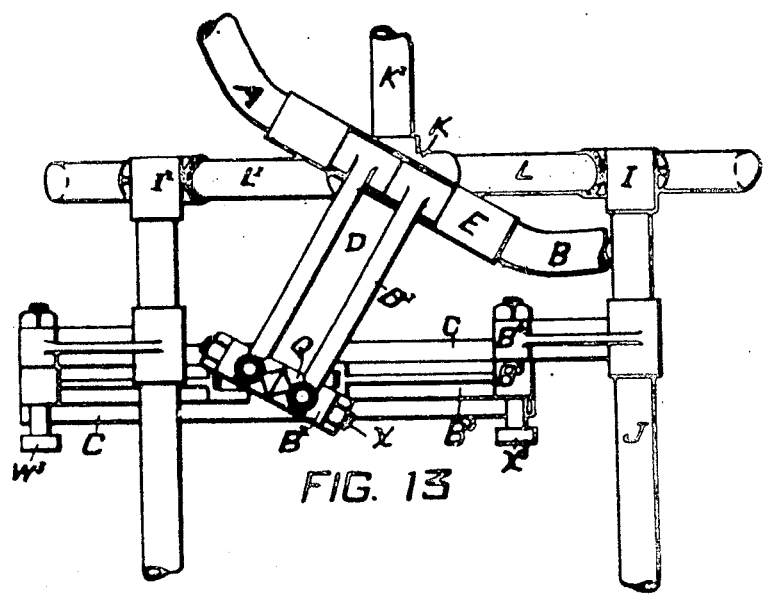
FIG. 13
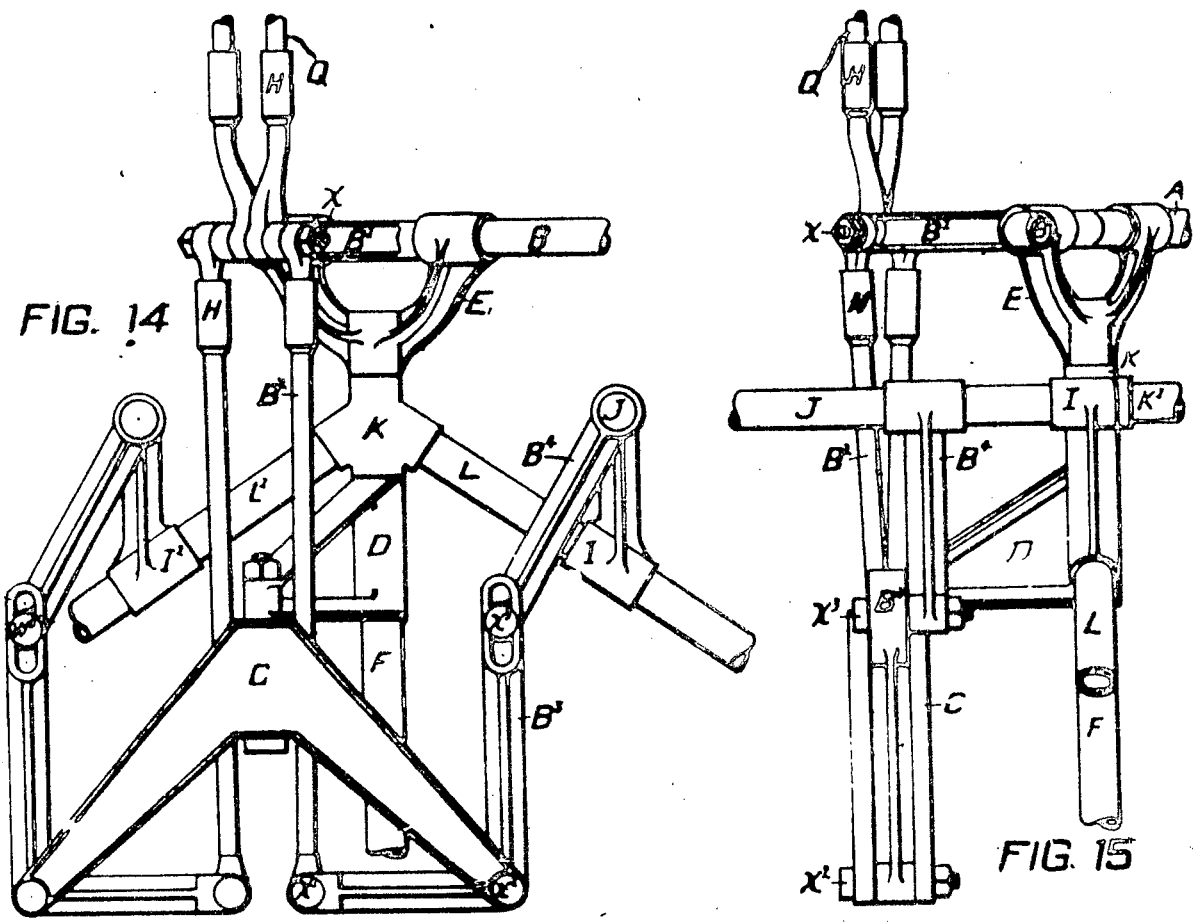
FIG. 14
FIG. 15

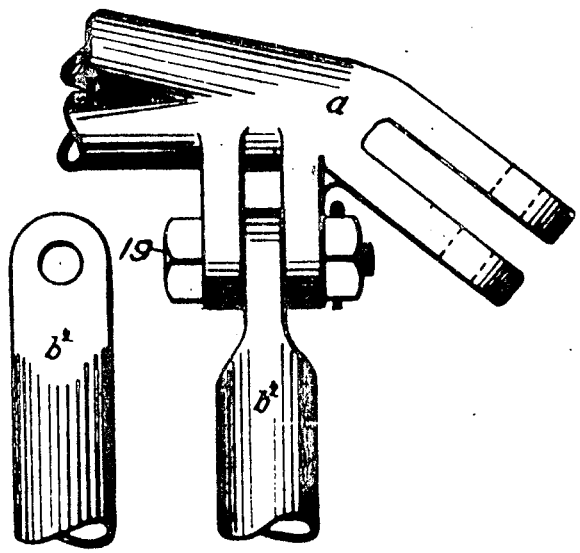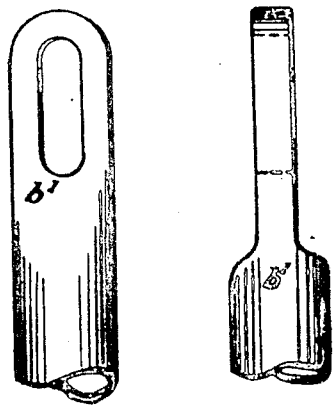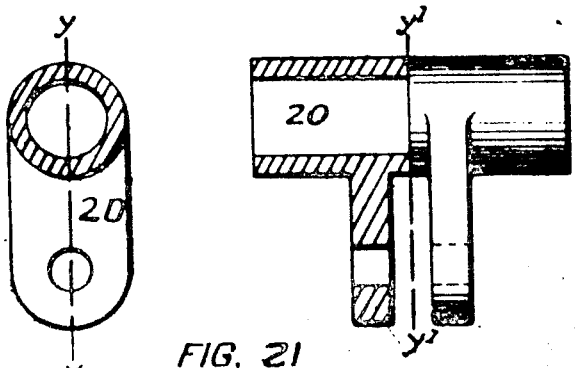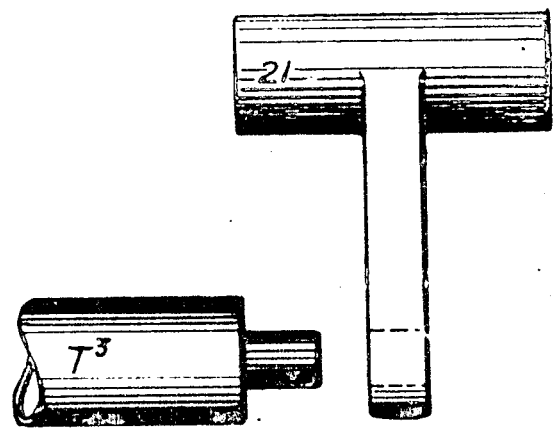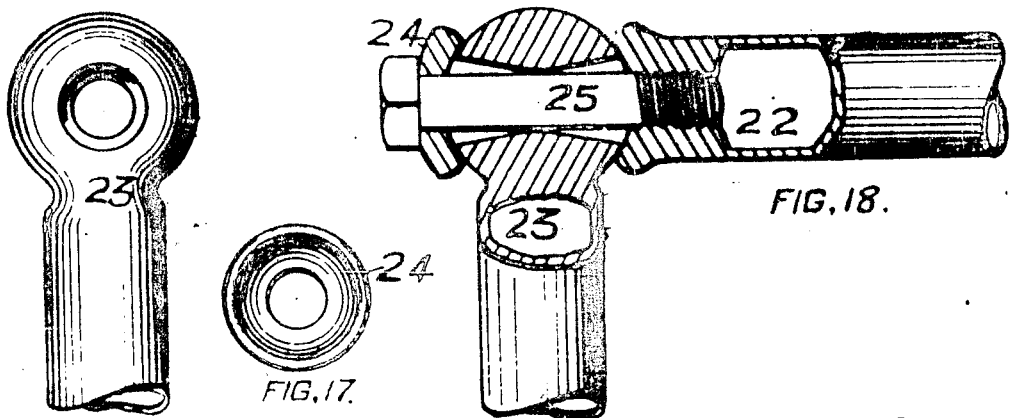

UNITED STATES PATENT OFFICE.

LAGAR R. CULVER, OF SALT LAKE CITY, UTAH.

AEROPLANE.

955,389.  Specification of Letters Patent.  Patented Apr. 19, 1910.

Application filed May 5, 1908. Serial No. 431,057.

*To all whom it may concern:*

Be it known that I, LAGAR R. CULVER, a citizen of the United States, residing at Salt Lake City, in the county of Salt Lake, and State of Utah, have invented certain new and useful Improvements in Aeroplanes, of which the following is a specification.

The purpose of my invention is to provide a frame and steering apparatus for an aeroplane that is light, strong and easily managed, that on the ground or in the air can be directed in its course by slight, yet positive movements of the parts by the manipulator. This I do by the device illustrated in the accompanying drawings, in which similar characters of reference indicate like parts throughout the several figures.

Figure 1:
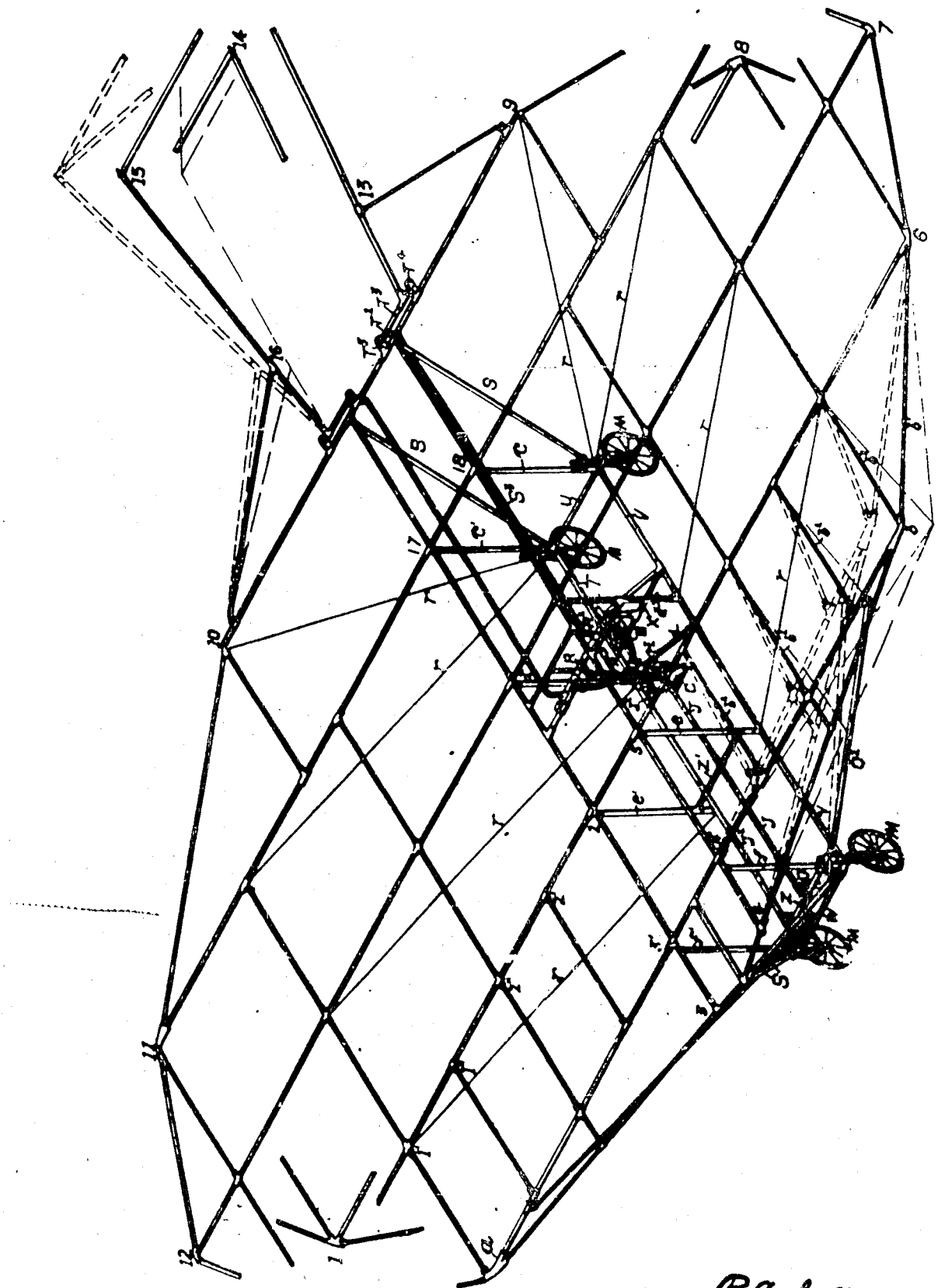
Figure 2:
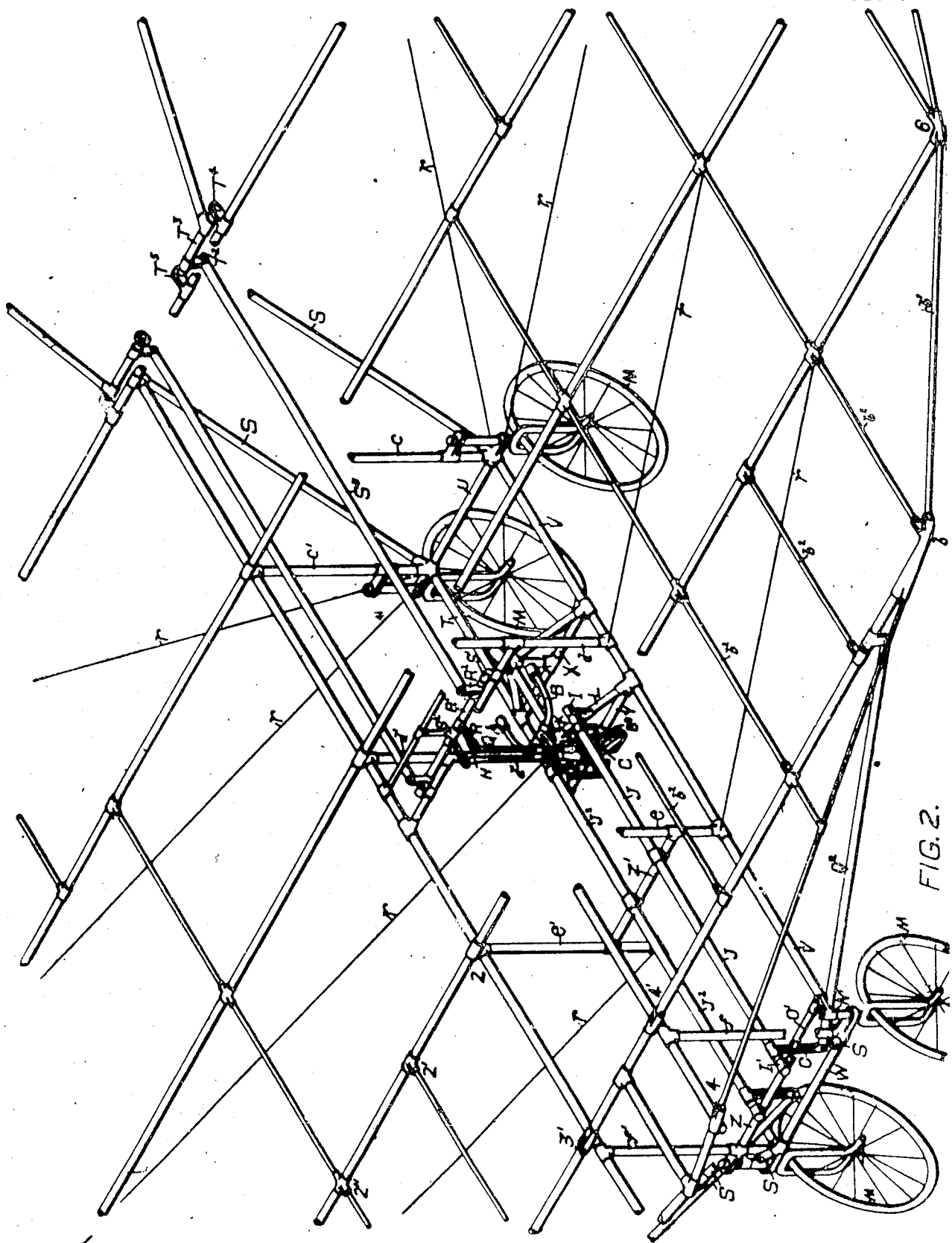
Figure 3:
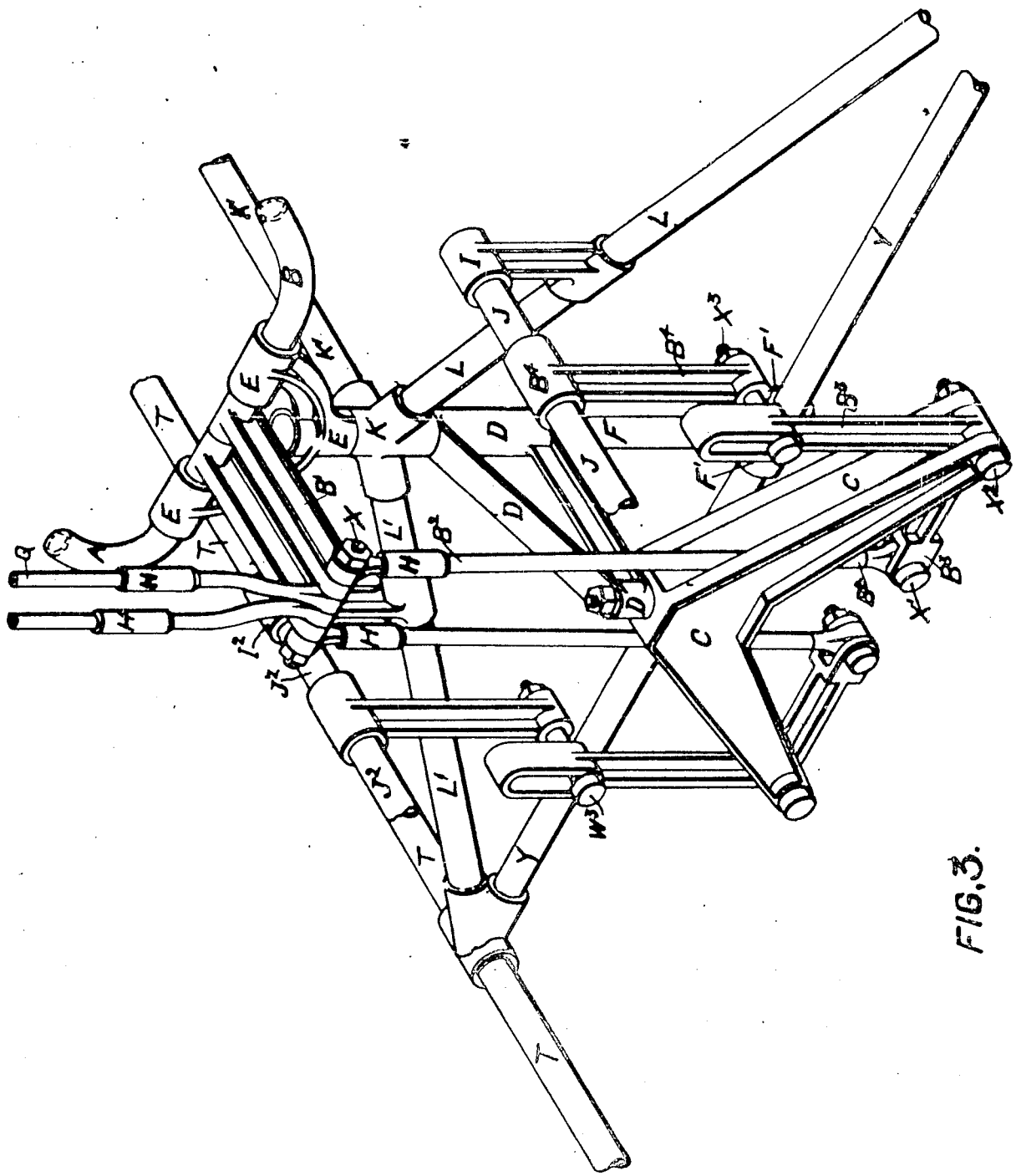
Figure 4:
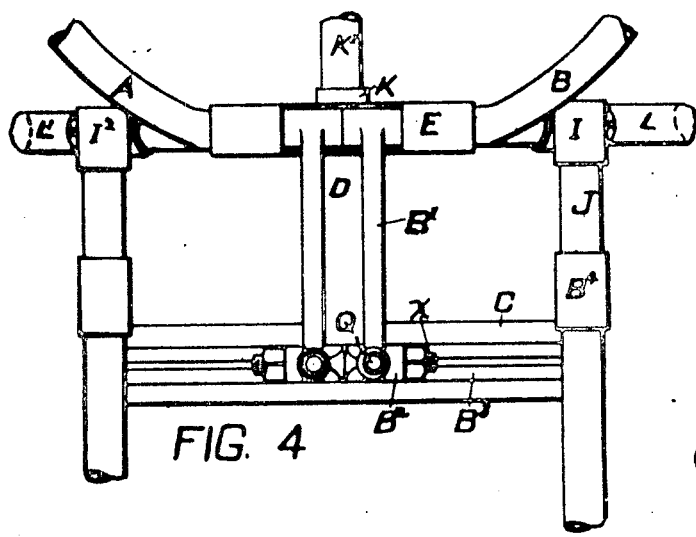
Figure 7:
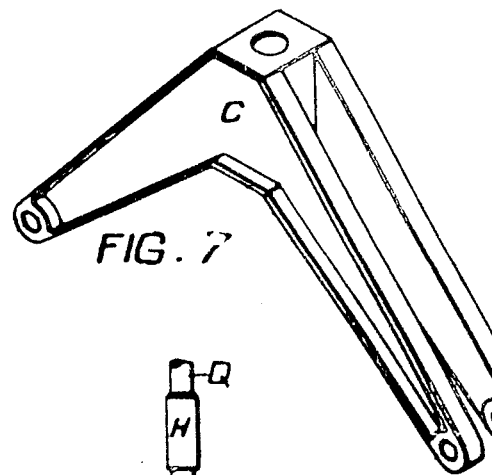
Figure 8:
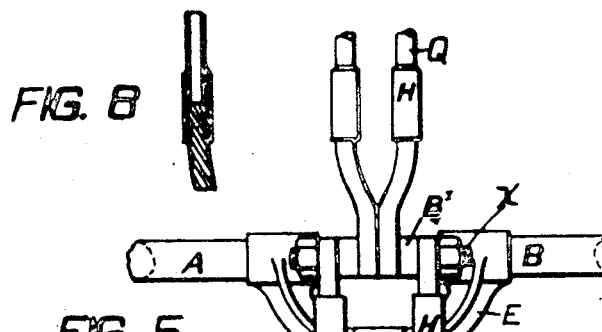
Figure 5:
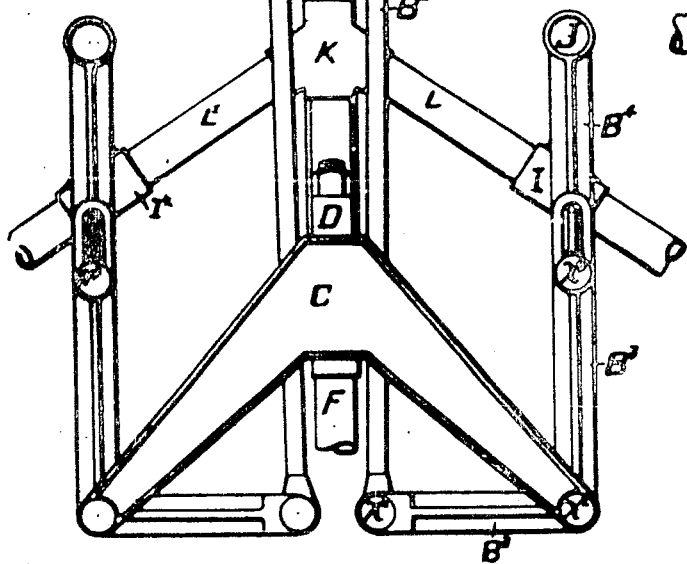
Figure 6:
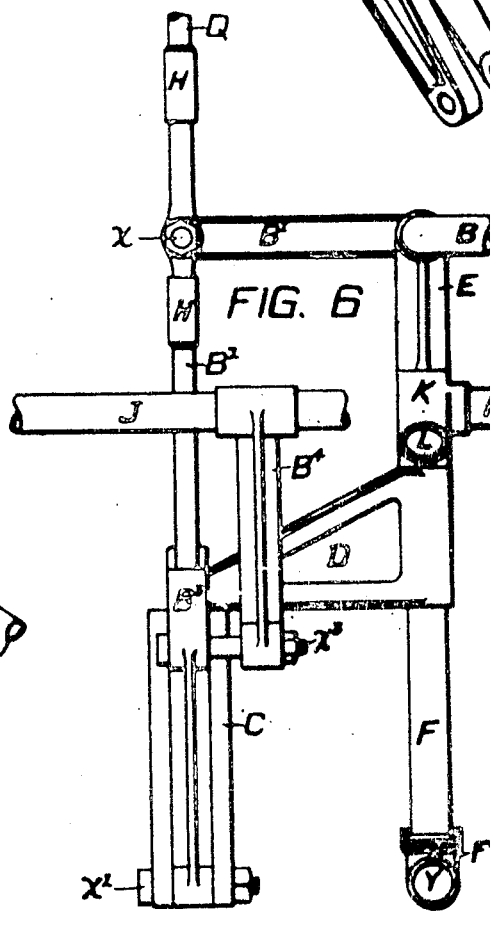

Figure 1 is a perspective. Fig. 2 is an enlarged perspective with parts broken out. Fig. 3 is an enlarged perspective of part of the steering mechanism. Fig. 4 is a plan of the steering parts showing position for an even keel. Fig. 5 is a front elevation of same. Fig. 6 is a side elevation of same. Fig. 7 is an isometric view of the shifter brace. Fig. 8 is a detail section of the reach rod swivel. Fig. 9 is a plan of the steering parts raising left wing and left side of tail piece, also lowering the right wing and right side of tail piece. Fig. 10 is a front elevation of same. Fig. 11 is a side elevation of same. Fig. 12 is one of the handle bar levers. Fig. 13 is a plan of the steering parts raising right wing and lowering the left, without changing the position of the tail. Fig. 14 is a front view of the same. Fig. 15 is a side view of the same. Figs. 16, 17 and 18 are enlarged views in detail of the different parts forming the extremity of the tail. Fig. 19 is an enlarged detail of parts forming a corner of the plane. Figs. 20, 21 and 22 are views in detail of parts forming the movable joints.

The frame of the plane is made of any strong material that has as little weight as possible, preferably steel tubing, and over it silk or other suitable material is tightly drawn and fastened, forming a rigid plane, 1, 2, 3, 4, 5, 6, 7, 8, 9, 10, 11 and 12, as shown in Fig. 1. The wings and tail are made of the same material. The right wing, filling the angle 1, 2, 3 (see Fig. 1) is secured to the frame by pivot joints at 1, 1', 1'', 2'', 2', 3' and 3, so that at the joint $a$ the wing may be raised or lowered from the horizontal plane as formed by the frame. The left wing is similar in construction to the right one, and the dotted lines show the left wing raised; the broken lines show it lowered. Similar lines show the same positions and changes of the tail. The tail as shown at 9, 13, 14, 15, 16 and 10 is connected by pivot joints at 9 and 10 to the frame. And the ball and socket joints at 14 and 15 allow either side of the tail to be raised or lowered independently. The steering parts are situated below the plane, and are carried by the frame shown at 3', 4', 17 and 18, and are supported by the depending tubes $c$, $c'$, $d$, $d'$, $e$, $e'$, $f$, $f'$, and stayed by the wires $r$, and the tube braces S, S.

For convenience in starting and on the ground, ordinary bicycle wheels, M are provided and secured, one wheel to each of the depending tubes $c$, $c'$, $f$, $f'$.

Secured on the lower frame T. U. V. W. by the cross tubes X. Y. and Z is the steering mechanism and so arranged and constructed that each side may be operated independently, or jointly with the other, and the description of one side, with its connections and adjustments will apply to the other side, except that one is left and the other right in some of their connections and adjustments.

The handle bars of the steering mechanism are shown as A the right, and B the left hand; each is connected to its lever by a key and key-way, the keyway being shown in Fig. 12. The handle bars are carried by the member E in bearings provided in its upwardly extended arms, and said member E is firmly secured on the vertical tube F. The latter is provided with the guide bearing K, to which are secured the brace tubes L and L' which carry the post bearings I and I'. The tube F also carries the bracket D, (to which is axially secured the shifting brace C) and a swivel bearing F' at its lower end which is mounted on the cross tube Y; the lever B' is pivotally connected to the reach B² by the bolt $x$, and the reach B² is pivoted to one arm of the bell crank lever B³ by the bolt $x'$. The bell crank lever B³ is fulcrumed to the shifting brace C by the bolt $x^2$; and the upper arm of the bell crank lever B³ is provided with a slotted hole, within which is made to operate the bolt $x^3$, which is firmly secured in the arm B⁴ of the rocking shaft J. The rocking shaft J is supported at one end by the post bearing I, and at the other end by the bearing I'. On the front or forward end of the rocking shaft J, is secured the arm O, which has pivoted to it one end of the reach rods O' and O². O' is pivoted to one end of the lever N', which is fastened at the other end to the standard of the bicycle wheel M. O² is pivoted at one end to the left wing. $b'$ is the border tube which reaches from the main plane at 6 to the point $b$ of the left wing, it has both ends pivoted and has slotted holes in its ends to allow a limited movement of the left wing. The brace tubes $b^2$ are pivoted at both ends. The rear bicycle wheels are not connected with the steering gear, but are swivelly attached to the frame. The reach Q is pivotally connected to arm R, which is secured on a rocking shaft R', which also carries arm R², and is carried by bearings S' and S², provided at each end. The arm R² is pivoted to the reach rod S³, which is connected to the arm T² of the rocking shaft T³. The latter is provided with bearings, and also carries secured thereon or integral therewith an arm that forms one side of the tail piece, and as we are describing the left side of the machine, it would form the left side of the tail piece. This side of the tail piece is braced at 13 by a brace reaching to the border tube, this brace is made rigid at that point to the tail piece, but is pivoted at the other end 9, to the frame of the machine.

The elasticity of the sides of the tail piece, and the ball and socket joints at its extreme corners allow for the difference needed in adjustment. The shifter brace C is permitted by the length of the bolts X³ and W³ to move on a horizontal plane from right to left or left to right by the shifting of arms B³ on said bolts, each of said bolts being longer than the thickness of said arms B³, and at the same time it does not change from a plane parallel with the main plane.

In operation (motion having first been imparted to the aeroplane) the aviator wishing to rise, with an even keel, pushes down on both handle bars, which will raise the four vertical reach rods, those ascending being marked Q, and those depending B³ and each is provided with a swivel joint at H to permit some rotary motion. The two depending rods being thus raised, will raise the horizontal arms of the bell crank levers B³, which will throw the vertical arms of the said levers out. They being connected to the two rear depending arms B⁴ of the shafts J and J², will turn them, the right one to the left and the left one to the right, this also turning the two depending arms O, on the forward ends of the shafts J and J² in the same manner. The reach rods O² that are connected to the wings and to these two depending arms O, on the forward ends of the shafts J and J² will be thrown out, (that is the right one to the right and the left one to the left), and this will raise both wings.

The two ascending reach rods are connected to two forwardly extended horizontal arms R, that are secured to two shafts R', the shafts have two upwardly extended arms R² that are connected to two horizontal reach rods S³, and when the ascending reach rods Q are raised, they will turn the two shafts and will shove back on the horizontal reach rods, they being connected to two other shafts T² in the rear, by two depending arms, and the last mentioned shafts will be turned in the opposite direction from the first, the sides of the tail being connected to the last mentioned shafts, the tail will be raised. When the handle bars are raised it will lower all four reach rods, and the movement throughout will be opposite from what it was when the handle bars were depressed, these two movements being used when wishing to ascend and descend. The ascending reach rods and connections control the tail, the depending ones the wings. When one handle bar is raised and the other lowered, it will raise one wing and lower the other wing, and will also raise one side of the tail and lower the other side; this will turn the machine to the right or left, according to the handle bar that is raised or lowered. One side of the machine can be given said movements without moving the other side by moving the handle bars on that side, but the shifting movement which will be next described is a joint movement of both wings without any tail movement.

The same horizontal directions of the machine as above described, may be secured by shifting the handle bars to the right or left; this will move the wings but not the tail, and is herein called the shifting movements. Wishing to turn by said shifting movement, say to the left, the aviator would shift the handle bars toward the left hand. This will move the shifting brace C to the right, and as the two bell crank levers B³ are connected to the shifting brace C, they will be carried to the right with the brace, and will remain in their central upright position if the handle bars are not moved up nor down, and as they are moved to the right and being connected to the depending arms of the shafts J and J² this will throw the arms on said shaft to the right and will turn the shafts to the left. This will raise the right wing and lower the left wing and as the four vertical reach rods are not moved up nor down, the tail will not be moved.

The front of the plane has two wings that can be raised or lowered, and the tail is connected to the steering apparatus in such a way, that both wings of the plane can be moved without moving the tail, each side of the tail may be raised or lowered independently of the other. When right and left wings are both raised together, it will raise both sides of the tail piece, and when both wings are lowered, the same action will lower the tail piece, but when one wing is raised, we will say the right wing, it will raise the right side of the tail piece, and if the left wing be lowered, it will lower the left side of the tail piece. This position of wing and tail would allow the air to go under the right wing and raise that side; the air would strike on the top of the right side of the tail piece and tend to lower it, but if the left side (wing and tail) would be lowered, the air would sheer off to the left, which would move the stern of the machine to the right, and as the left wing would be down, the air would go over it, and would tilt the machine to the left, and would move the whole machine in a curve to the left.

When the aviator wishes to go in a straight line, the wings can be moved, so as not to throw the machine to the right or left, by moving the handle bars to the right or left, as the case may require; that is, if the machine tips to the right, he would move his handle bars to the left, which would not move the tail, but would raise the right wing and let the air go under it, and would lower the left wing and let the air go over it, which would tilt the machine to the left. When it was on an even keel, he would move his handle bars back to the center. If the front of the machine started down, he would lower his handle bars, which would raise both wings and both sides of the tail jointly; the air would then go under the wings and would raise the front edge of the machine, and striking the top of the tail piece, would throw the stern down. If he wanted to turn to the left, he would raise his left handle bar, and lower his right handle bar, which would lower the left wing and raise the right one, and tilt the machine to the left, and as the right side of the tail piece would be up, and the left one down, the air would strike the right side, and be thrown off to the left, which would throw the stern of the machine to the right. When the machine was around far enough the aviator would move his handle bars to the position shown in Figs. 4, 5 and 6, which would be an even keel.

Having thus described my invention, I desire to secure by Letters Patent, and claim:

1. In an aeroplane, the combination of a kite shaped frame having its front corners movable, and a tail piece pivoted to said frame, the side of said tail piece forming one arm of a rocking shaft, a reach pivoted to the other arm of said rocking shaft, another rocking shaft one arm of which is pivoted to said reach, and the other arm of the second mentioned rocking shaft pivoted to one end of a vertical reach, and said vertical reach being pivoted at one end to a handle bar lever.

2. In an aeroplane, the combination of a kite shaped frame having its front corners movable, a tail piece whose side is an arm of a rocking shaft pivoted to said frame, the other arm of said rocking shaft being pivoted to a reach rod, said reach rod actuated by one arm of another rocking shaft, the other arm of said last mentioned rocking shaft being pivoted to a vertical reach, said vertical reach being pivoted to the handle bar lever, a reach also pivoted to said lever, and depending therefrom, one arm of a bell crank lever being pivoted to the lower end of said reach, a slotted hole in the other arm of said bell crank lever, a bolt adapted to be operated in said hole, one arm of another rocking shaft secured to said bolt, the other arm of said latter rocking shaft being pivoted to a brace tube, to the other end of which is connected the wing of the frame.

3. In an aeroplane, the combination of a wheeled frame whose front corners are movable above and below the plane thereof, a tail piece pivoted to said frame, means for moving each side of said frame and tail jointly or severally above and below the plane of said frame, said means consisting of a separate handle bar for each side of the machine, a lever attached thereto, a vertical reach pivoted at its lower end to said lever, one arm of a rock shaft pivoted to said vertical reach, a horizontal reach pivoted to the other arm of said rock shaft, one arm of another rock shaft pivoted to the other end of said horizontal reach, one side of said tail piece forming the other arm of said last mentioned rock shaft, the upper end of an actuating bar secured to said handle bar lever, the lower end of said actuating bar being pivoted to one arm of a bell crank lever, to the other arm of which lever is pivoted one end of a lever that is secured on a rocking shaft, a depending arm on said rocking shaft, a shifting bar secured to said arm, the other end of said shifting bar pivoted to the wing of the plane, an actuating bar, one end of which is attached to said depending arm of the last mentioned rocking shaft, the other end of said actuating bar being pivoted to a lever that is secured to the standard of a forward wheel.

4. In an aeroplane, the combination of a kite shaped frame, the front corners thereof being pivoted to said frame and adapted to be raised or lowered, each independently of the other, a frame suspended from said kite shaped frame, cross tubes secured on said last mentioned frame, steering mechanism secured on said tubes, road wheels operated by said steering mechanism, said steering mechanism consisting of two handle bars, a member attached thereto, and adapted to turn a vertical tube, bearings for said tube, a bracket secured on said tube, a shifting brace secured to the front end of said bracket, two bell crank levers, one on each side fulcrumed to the lower extremity of said shifting brace, horizontal arms on said levers pivotally connected to the lower ends of two vertical reach rods, the vertical arms of said levers having slotted openings therein, bolts integral with depending levers and adapted to operate in said slotted openings, rocking shafts to which said depending levers are secured, bearings for said shafts, others arms on said shafts pivotally connected to diagonal shifting tubes the latter being pivoted, one end of each to one arm of each of said shafts, the other ends of said tubes being pivoted to the wings of the machine, as and for the purposes described.

5. The combination of a covered, kite shaped frame, the front corners pivoted to permit a portion thereof to be raised or lowered from the plane of said frame, a tail piece pivoted to said frame, and means for raising or lowering a portion of said front corners above or below the plane of said frame without moving the said tail piece, said means consisting of handle bars secured on the top of a vertical tube, a bracket brace also secured on said tube, a member pivoted on the end of said bracket brace, bell crank levers fulcrumed to the bottom of said member, an arm on each of said bell crank levers pivoted to a depending arm of a rocking shaft, two rocking shafts, one on each side of said frame and each having two depending arms, bolts secured to one of said depending arms on each rocking shaft, a tube brace pivoted at one end to the other arm of each shaft, and the other end of each tube brace being pivoted to the outer corner of the front edge of said frame, as and for the purposes described.

6. The combination of a covered kite shaped frame, the front corners of said frame adapted to move above and below the plane of said frame—a tail piece pivoted to said frame, ball and socket joints at the rear corners of said tail, and means for moving the front corners of said frame and the rear portion of said tail piece above and below the plane of said frame, means for moving the front corner on either side and the rear corner of the tail on the same side above the plane of said frame, and at the same time to move the other front corner of said frame, and the other rear corner of the tail below the plane of said frame, as and for the purposes described.

7. The combination of a covered kite shaped frame, the front corners of said frame adapted to move above and below the plane of said frame—a tail piece pivoted to said frame, ball and socket joints at the rear corners of said tail and means for moving the front corners and tail above and below the plane of said frame, with means for moving the front corner on either side and the rear corner of the tail on the same side above the plane of said frame, and at the same time for moving the other front corner of said frame, and the other rear corner of the tail below the plane of said frame, said means consisting of two handle bars, two levers carried thereby, one by each handle bar, one ascending and one depending reach rod pivoted to each lever, an arm on each of two rocking shafts being pivoted to the upper end of each of said ascending reach rods, the other arm of each of said rocking shafts being pivoted to one end of horizontal rods, one to each rod, two other rocking shafts, an arm on each pivoted to the said horizontal rod on that side, another arm on each of said last mentioned rocking shafts extended to form the sides of the said tail piece, and an arm of each of two bell crank levers pivoted one to each at the lower end of said depending reach rods, a depending arm of each of two rocking shafts pivoted to a vertical arm of the bell crank lever on its side, and another depending arm on each of said last mentioned rocking shafts pivoted to braces that are connected at their other ends to the movable corners of the frame, as and for the purposes described.

In testimony whereof I have affixed my signature in presence of two witnesses.

LAGAR R. CULVER.

Witnesses:
F. B. HUFFMAN,
C. M. HINSON.